(12) United States Patent
Wang et al.

(10) Patent No.: US 9,887,539 B2
(45) Date of Patent: Feb. 6, 2018

(54) POWER CONVERSION DEVICE

(71) Applicant: FUJI ELECTRIC CO., LTD., Kawasaki (JP)

(72) Inventors: Qichen Wang, Hino (JP); Satoru Fujita, Tachikawa (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 225 days.

(21) Appl. No.: 14/877,260

(22) Filed: Oct. 7, 2015

(65) Prior Publication Data

US 2016/0028232 A1 Jan. 28, 2016

Related U.S. Application Data

(63) Continuation of application No. PCT/JP2013/005985, filed on Oct. 8, 2013.

(51) Int. Cl.
| | |
|---|---|
| *H02J 1/10* | (2006.01) |
| *H02J 3/38* | (2006.01) |
| *H02J 3/00* | (2006.01) |
| *H02M 1/12* | (2006.01) |
| *H02M 5/458* | (2006.01) |
| *H02M 7/537* | (2006.01) |
| *H02M 7/487* | (2007.01) |
| *H02M 1/00* | (2006.01) |

(52) U.S. Cl.
CPC .............. *H02J 3/00* (2013.01); *H02M 1/12* (2013.01); *H02M 5/4585* (2013.01); *H02M 7/537* (2013.01); *H02M 7/487* (2013.01); *H02M 2001/0093* (2013.01)

(58) Field of Classification Search
USPC ............................................. 307/52; 363/41
See application file for complete search history.

(56) References Cited

U.S. PATENT DOCUMENTS 6,269,012 B1 * 7/2001 Kusakabe ............. H02M 7/217
   323/239
2013/0235625 A1   9/2013 Yamada
(Continued)

FOREIGN PATENT DOCUMENTS

CN       103081324 A    5/2013
EP        2642651 A1    9/2013
(Continued)

*Primary Examiner* — Adam Houston
(74) *Attorney, Agent, or Firm* — Rabin & Berdo, P.C.

(57) ABSTRACT

A power conversion device includes an AC power source configured to output an AC voltage, a DC power source configured to output a plurality of DC voltages having different levels, an inverter configured to receive the AC voltage and the plurality of DC voltages and output an output voltage by boosting the AC voltage in a booster mode in accordance with first and second control signals, the booster mode being a mode in which a level of the AC voltage is smaller than a predetermined value, a reactor configured to smooth the output voltage of the inverter, and a control circuit configured to generate the first and second control signals using a first and second carrier signals having different frequencies, respectively, in the booster mode, and selectively output the first or second control signal in accordance with the level of the AC voltage from the AC power source.

17 Claims, 6 Drawing Sheets

(56) References Cited

U.S. PATENT DOCUMENTS

| | | | | |
|---|---|---|---|---|
| 2014/0176100 A1* | 6/2014 | Hara | ................. | H02M 7/00 |
| | | | | 323/282 |
| 2015/0124498 A1* | 5/2015 | Banno | ................. | H02M 5/458 |
| | | | | 363/41 |
| 2016/0233777 A1* | 8/2016 | Murakami | ......... | H02M 3/33561 |

FOREIGN PATENT DOCUMENTS

| | | |
|---|---|---|
| JP | H02-168895 A | 6/1990 |
| JP | H04-236171 A | 8/1992 |
| JP | H10-75581 A | 3/1998 |
| JP | 3203464 B2 | 8/2001 |
| JP | 2006-296098 A | 10/2006 |
| JP | 2011-109739 A | 6/2011 |
| JP | 2012-175882 A | 9/2012 |
| JP | 2013-021764 A | 1/2013 |
| JP | 2013-172620 A | 9/2013 |
| WO | WO-2012/067167 A1 | 5/2012 |

\* cited by examiner

POWER CONVERSION DEVICE

CROSS-REFERENCE TO RELATED APPLICATION

This is a continuation application of International Application number PCT/JP2013/005985, which was filed on Oct. 8, 2013 and designated the United States. The disclosure of this earlier application is incorporated herein by reference.

BACKGROUND OF THE INVENTION

Technical Field

The present invention relates to a power conversion device which can supply a stable voltage to a load even when the voltage of an alternating current power source drops.

Background Art

As a power conversion device which can supply a stable voltage to a load even when the voltage of an alternating current power source drops, an on-line type power conversion device is known. FIG. 7 is a diagram for illustrating the on-line type power conversion device disclosed in Japanese Patent Application Publication No. 10-075581 and International Publication No. WO2012/067167A1. In the drawing, 1 is a single-phase alternating current power source, 2 is a capacitor, 3 is a converter, 4 is an inverter, 5 is a filter, and 6 is a load.

The power conversion device converts the voltage of the alternating current power source 1 once to a direct current voltage, converts the direct current voltage again to an alternating current voltage, and supplies the alternating current voltage to the load 6.

Herein, the operation of converting the voltage of the alternating current power source 1 to a direct current voltage is carried out by the converter 3. The converter 3, by turning on/off switching elements Qp and Qn, converts the voltage of the alternating current power source 1 to a direct current voltage. The direct current voltage generated by the converter 3 is smoothed by capacitors Cp and Cn. The direct current voltage smoothed by the capacitors Cp and Cn is output to the inverter 4.

The inverter 4, by selectively turning on/off the switching elements Q1 and Q2 and a bidirectional switch BS1, converts the direct current voltage of the capacitors Cp and Cn to an alternating current voltage Vu of a pulse-width controlled pulse train. The filter 5 removes a harmonic component contained in the alternating current voltage Vu of the pulse train, and outputs a sinusoidal alternating current voltage Vload. The sinusoidal alternating current voltage Vload is applied to the load 6.

The heretofore described power conversion device includes, as its operation modes, a direct feed mode, a boost mode, a buck mode, and a backup mode. In which mode the power conversion device operates is determined by detecting the voltage of the alternating current power source 1 or the like.

The direct feed mode is an operation mode in which to output the voltage of the alternating current power source 1 as the alternating current voltage Vload when the voltage of the alternating current power source 1 is within a predetermined range. In this operation mode, the switching elements Q1 and Q2 are turned off, and the bidirectional switch BS1 is turned on.

The boost mode is an operation mode in which to boost the voltage of the alternating current power source 1, and output the alternating current voltage Vload having a predetermined amplitude, when the voltage of the alternating current power source 1 becomes lower than a predetermined value. In this operation mode, the switching elements Q1 and Q2 and the bidirectional switch BS1 are selectively turned on/off based on a pulse-width modulated control signal.

The buck mode is an operation mode in which to buck the voltage of the alternating current power source 1, and output the alternating current voltage Vload having a predetermined amplitude, when the voltage of the alternating current power source 1 becomes higher than the predetermined value. In this operation mode, the switching elements Q1 and Q2 are turned off, and the bidirectional switch BS1 is turned on/off based on a pulse-width modulated control signal.

The backup mode is an operation mode in which to output the alternating current voltage Vload having a predetermined amplitude, using the direct current voltage of the capacitors Cp and Cn, when an interruption of the alternating current power source 1 is detected. In this operation mode, the bidirectional switch BS1 is turned off, and the switching elements Q1 and Q2 are selectively turned on/off based on a pulse-modulated control signal.

SUMMARY OF THE INVENTION

In the meantime, in the heretofore described kind of power conversion device, a current containing a ripple current flows through a reactor Lf of the filter 5. It is necessary to suppress a loss caused by the ripple current in order to make the reactor Lf small. Therefore, in the heretofore described power conversion device, a ripple component of the current flowing through the reactor Lf has to be restricted to be within a predetermined value.

Meanwhile, the heretofore described power conversion device turns on/off the switching elements Q1 and Q2 at the same frequency in both operations when in the boost mode and when in the backup mode. The variation width of a voltage applied to the reactor Lf reaches its maximum when outputting the alternating current voltage using only the voltage of a direct current power source. Consequently, the ripple current flowing through the reactor Lf reaches its maximum when in the backup mode. Therefore, the inductance value of the reactor Lf is determined so that the ripple current when in the backup mode is within the predetermined value.

However, the inductance value of the reactor Lf determined in this way is a value larger than an inductance value required when in boost operation. In order to obtain a large inductance value, it is necessary to increase the number of turns of a coil wound around the core of the reactor Lf. When the number of turns of the coil is increased, the conductor resistance of the coil increases, and the copper loss of the reactor Lf increases. As a result of this, there arises the problem that the power conversion device decreases in efficiency. Also, there is the problem that the power conversion device increases in size as the reactor Lf becomes larger.

The invention has been contrived in order to solve these kinds of problems which the heretofore known technology has. That is, an object of the invention lies in providing a power conversion device which can restrict the ripple current to be within the predetermined value, even when there is an instantaneous voltage drop of the alternating current power source, while suppressing an increase in the inductance value of the reactor Lf.

In order to achieve the heretofore described object, the invention is applied to a power conversion device which outputs an alternating current voltage based on an output voltage command. The power conversion device includes a direct current power source, an alternating current power source, an inverter, a reactor which smoothes an output voltage of the inverter, and a control section which controls the inverter. One end of the alternating current power source is connected to an intermediate potential point of the direct current power source.

The control section commands a carrier signal of a first frequency when on a first condition. Also, the control section commands a carrier signal of a second frequency higher than the first frequency when on a second condition. The first condition is that the voltage of the alternating current power source is smaller than the output voltage command, and that the difference between the output voltage command and the voltage of the alternating current power source is smaller than a predetermined value. The second condition is that the voltage of the alternating current power source is smaller than the output voltage command, and that the difference between the output voltage command and the voltage of the alternating current power source is larger than the predetermined value. Further, the control section, based on the output voltage command and the commanded carrier signal, generates a control signal for operating the inverter.

The inverter outputs a predetermined alternating current voltage based on the control signal generated in the control section. The alternating current voltage is generated using a voltage across, and a neutral point voltage of, the direct current power source and the voltage of the alternating current power source.

In the power conversion device, the control section, when determining the first condition and second condition, can use the respective effective values of, or the respective instantaneous values of, at least the output voltage command and the voltage of the alternating current power source.

In the power conversion device, the first frequency and second frequency of the carrier signal are set to be in a relationship in which the maximum amplitudes of a ripple current flowing through the reactor when the inverter operates at the respective frequencies are substantially the same.

In the power conversion device, the second frequency of the carrier signal is set in accordance with the difference between the output voltage command and the voltage of the alternating current power source.

In the power conversion device, the inverter operates until the voltage of the alternating current power source drops to 0V.

An embodiment of the inverter in the power conversion device includes at least a switching element series circuit and a bidirectional switch. The switching element series circuit is configured by connecting a first switching element and second switching element in series. The switching element series circuit is connected across the direct current power source. A first diode is connected in reverse parallel to the first switching element. A second diode is connected in reverse parallel to the second switching element.

One end of the bidirectional switch is connected to a connection point of the first and second switching elements, and the other end is connected to the other end of the alternating current power source.

In the inverter of the power conversion device, the first and second switching elements can be each configured of a MOSFET formed of a wide band gap semiconductor with either silicon carbide or gallium nitride as a material.

Also, in the inverter of the power conversion device, the first and second diodes can be each formed of a wide band gap semiconductor with either silicon carbide or gallium nitride as a material.

Also, in the inverter of the power conversion device, the bidirectional switch can be configured by connecting MOSFETs, each formed of a wide band gap semiconductor with either silicon carbide or gallium nitride as a material, in reverse parallel.

Also, in the inverter of the power conversion device, the bidirectional switch can also be configured including diodes each formed of a wide band gap semiconductor with either silicon carbide or gallium nitride as a material.

According to the invention, as the operation frequency of the inverter is switched in a boost mode, it is possible to restrict the ripple current to be within the predetermined value, when there is an instantaneous voltage drop of the alternating current power source, while suppressing an increase in the inductance value of the reactor.

DETAILED DESCRIPTION OF THE INVENTION

Figure 1:
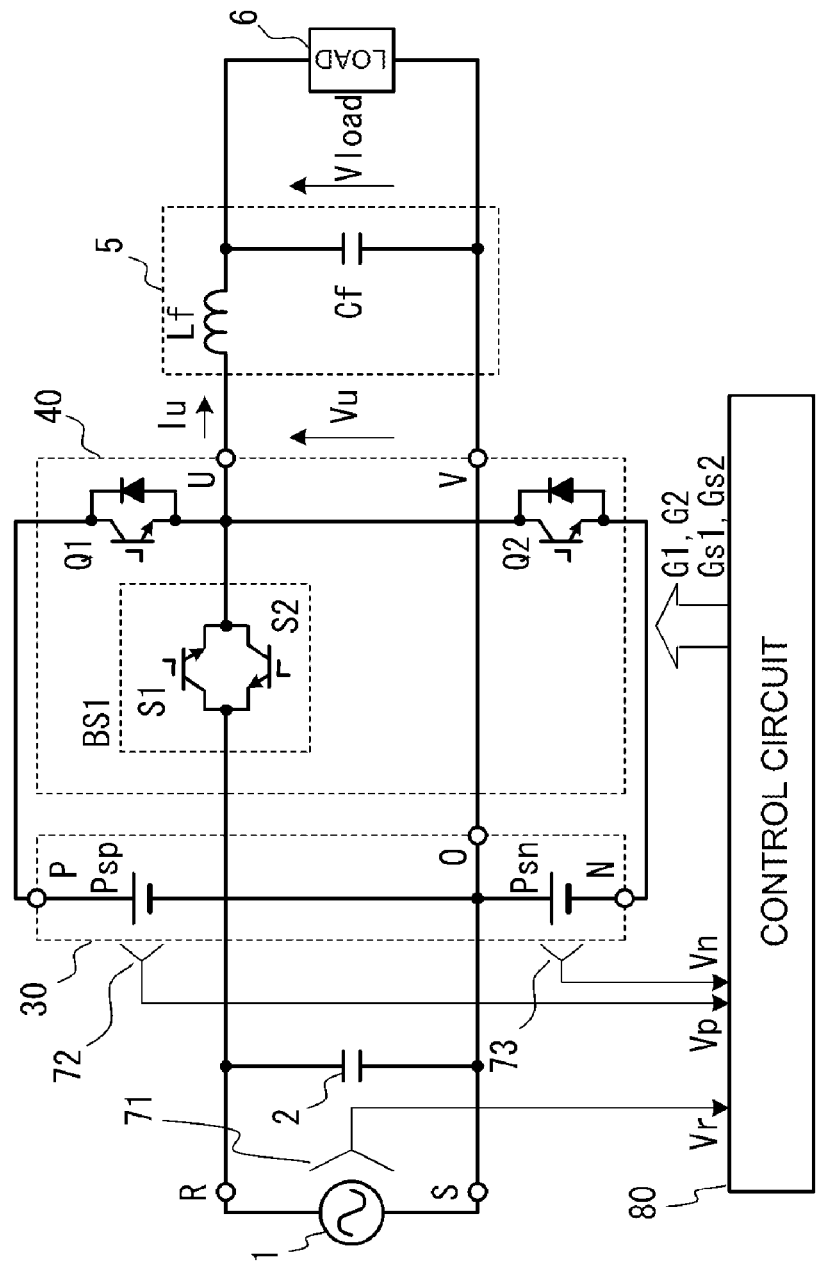
FIG. 1 is a diagram for illustrating one embodiment of a power conversion device to which the invention is applied.

Hereafter, a description will be given, while referring to the drawings, of an embodiment of the invention.

FIG. 1 is a diagram for illustrating a circuit configuration of a power conversion device according to one embodiment of the invention. In the drawing, 1 is a single-phase alternating current power source. A capacitor 2 is connected between a terminal R and terminal S of the alternating current power source 1. Also, 30 is a direct current power source, 40 is an inverter, 5 is a filter, 6 is a load, and 80 is a control section.

The direct current power source 30 is a power source wherein a positive side direct current power source Psp (a first direct current power source) and a negative side direct current power source Psn (a second direct current power source) are connected in series. The direct current power source 30 includes terminals P, O, and N. The terminal P is connected to the high potential side terminal of the direct current power source 30. The terminal N is connected to the low potential side terminal of the direct current power source 30. The terminal O is connected to a connection point (a terminal which outputs an intermediate voltage of the direct current power source 30) of the direct current power source Psp and direct current power source Psn. The terminal S of the alternating current power source 1 is connected to the terminal O of the direct current power source 30.

Figure 7:
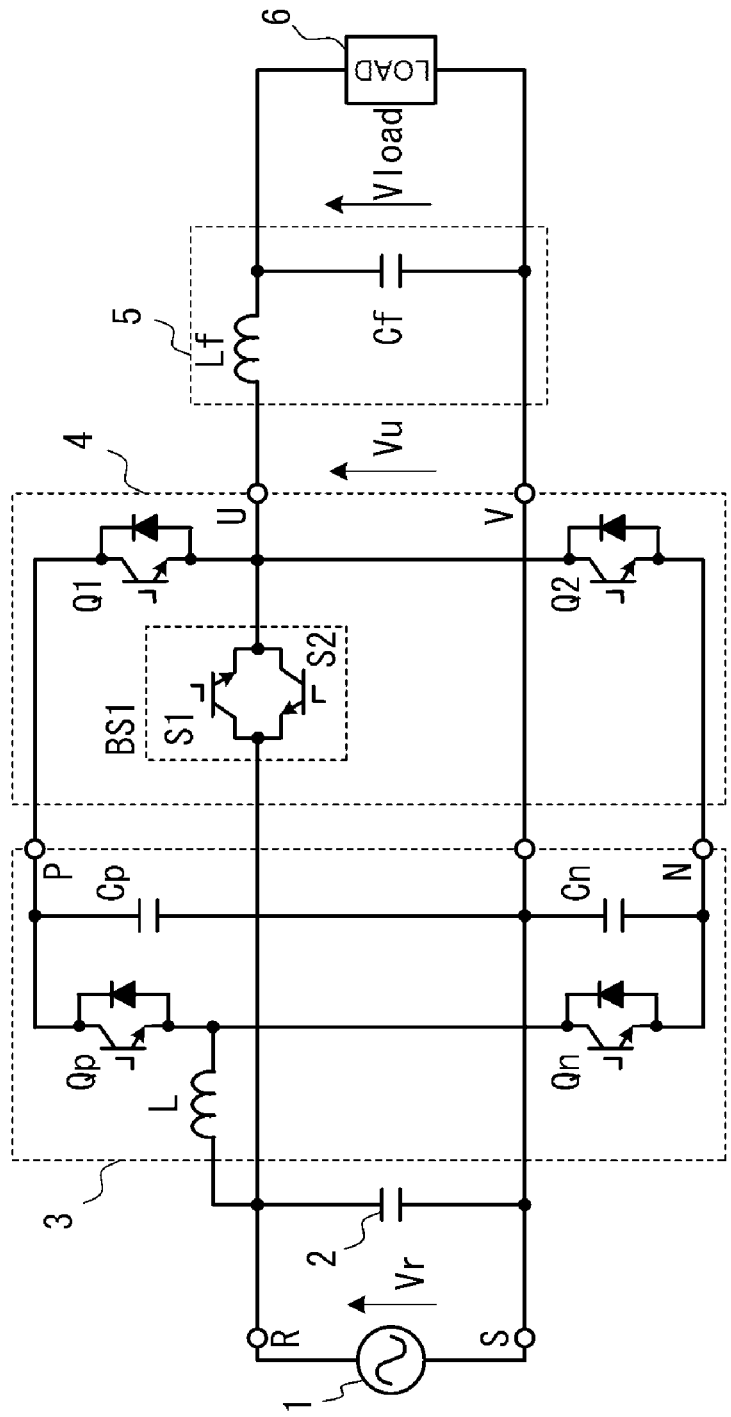
FIG. 7 is a diagram for illustrating a power conversion device according to a heretofore known technology.

The direct current power source 30 formed of the direct current power source Psp and direct current power source Psn can be configured of, for example, a converter 3 shown in FIG. 7. The converter 3 outputs a three-level potential using a voltage Vr of the alternating current power source 1. However, the direct current power source 30, not being limited to a circuit configuration such as the converter 3, may be a circuit configured of another type.

The inverter 40 is configured of a switching element series circuit and a bidirectional switch BS1. Also, the inverter 40 includes a terminal U (a first alternating current output terminal) and terminal V (a second alternating current output terminal) for outputting an alternating current voltage.

The switching element series circuit is a circuit wherein switching elements Q1 and Q2 are connected in series. The switching element series circuit is connected between the terminal P and terminal N of the direct current power source 30. A connection point of the switching elements Q1 and Q2 is connected to the terminal U. The terminal V is connected to the terminal O of the direct current power source 30.

The bidirectional switch BS1 is a circuit wherein switch elements S1 and S2 are connected in reverse parallel. The bidirectional switch BS1 is connected between the terminal U and the terminal R. Specifically, the collector terminal side of the switch element S1 is connected to the terminal R. Also, the emitter terminal side of the switch element S1 is connected to the terminal U.

The filter 5 is configured of a series circuit of a reactor Lf and capacitor Cf. The filter 5 is connected between the terminals U and V of the inverter 40. The load 6 is connected across the capacitor Cf.

In FIG. 1, the switching elements Q1 and Q2 are each shown by an IGBT (Insulated Gate Bipolar Transistor) to which a diode is connected in reverse parallel. However, the switching elements Q1 and Q2 are not limited to elements configured in this way. Each switching element Q1 and Q2 may be configured using another semiconductor element, such as a MOSFET (Metal Oxide Semiconductor Field Effect Transistor), which can be on/off operated at a high frequency which is several tens of times or more as high as the frequency of the alternating current power source 1.

The bidirectional switch BS1, by turning on one switch element, can cause a current to flow in one direction. Also, the bidirectional switch BS1, by turning on the other switch element, can cause the current to flow in the other direction. Consequently, the bidirectional switch BS1 may be one of another configuration as long as the one can fulfill this kind of function.

In the power conversion device, the terminal P of the direct current power source 30 outputs a positive potential (hereafter referred to as a positive voltage Vp) of the direct current power source Psp. The terminal O of the direct current power source 30 outputs an intermediate potential (hereafter referred to as a zero voltage) of the direct current power source 30. The terminal N of the direct current power source 30 outputs a negative potential (hereafter referred to as a negative voltage Vn) of the direct current power source Psn. The terminal R of the alternating current power source 1 outputs the voltage Vr of the alternating current power source 1.

The inverter 40, by causing a current to flow through the switching element Q1, outputs the positive voltage Vp between the terminals U and V. Also, the inverter 40, by causing a current to flow through the switching element Q2, outputs the negative voltage Vn between the terminals U and V. Also, the inverter 40, by causing a current to flow in either direction of the bidirectional switch BS1, outputs the voltage Vr of the alternating current power source 1 between the terminals U and V. Further, the inverter 40, by controlling an on/off operation of the switching elements Q1 and Q2 and bidirectional switch BS1, outputs a single-phase alternating current voltage Vu between the terminals U and V.

Next, a description will be given of an operation of the power conversion device according to the embodiment. The power conversion device has a direct feed mode, a boost mode, and a buck mode. Operations in the direct feed mode and buck mode of the power conversion device are the same as those of a power conversion device shown in FIG. 7. Hereafter, a description will be given mainly of the operation of the power conversion device in the boost mode, thus omitting a description of the direct feed mode and buck mode.

When the voltage Vr of the alternating current power source 1 is equal to or less than a first set voltage, the power conversion device operates in the boost mode. Further, the power conversion device continues the boost-mode operation until the voltage Vr drops further and reaches 0V. During this time, no interruption of the alternating current power source 1 is detected. Herein, the boost mode is a mode in which the power conversion device outputs a predetermined voltage Vload, which is larger than the voltage Vr, using the voltage Vr of the alternating current power source 1 and a three-level voltage (the voltages Vp and Vn and the zero voltage) of the direct current power source 30.

The power conversion device, in the boost mode, switches between frequencies, at which the switching elements Q1 and Q2 are turned on/off, in accordance with the size of the voltage Vr of the alternating current power source 1. By this operation, an increase in a ripple current flowing through the reactor Lf is suppressed.

Specifically, the power conversion device carries out a boost operation at a first frequency when the voltage Vr of the alternating current power source 1 is smaller than an output command voltage V*, and the difference between the voltage Vr and the output command voltage V* is smaller than a predetermined value (a first condition). Also, the power conversion device carries out a boost operation at a second frequency when the voltage Vr of the alternating current power source 1 is smaller than the output command voltage V*, and the difference between the voltage Vr and the output command voltage V* is equal to or more than the predetermined value (a second condition). The second frequency is a frequency higher than the first frequency.

Figure 2:
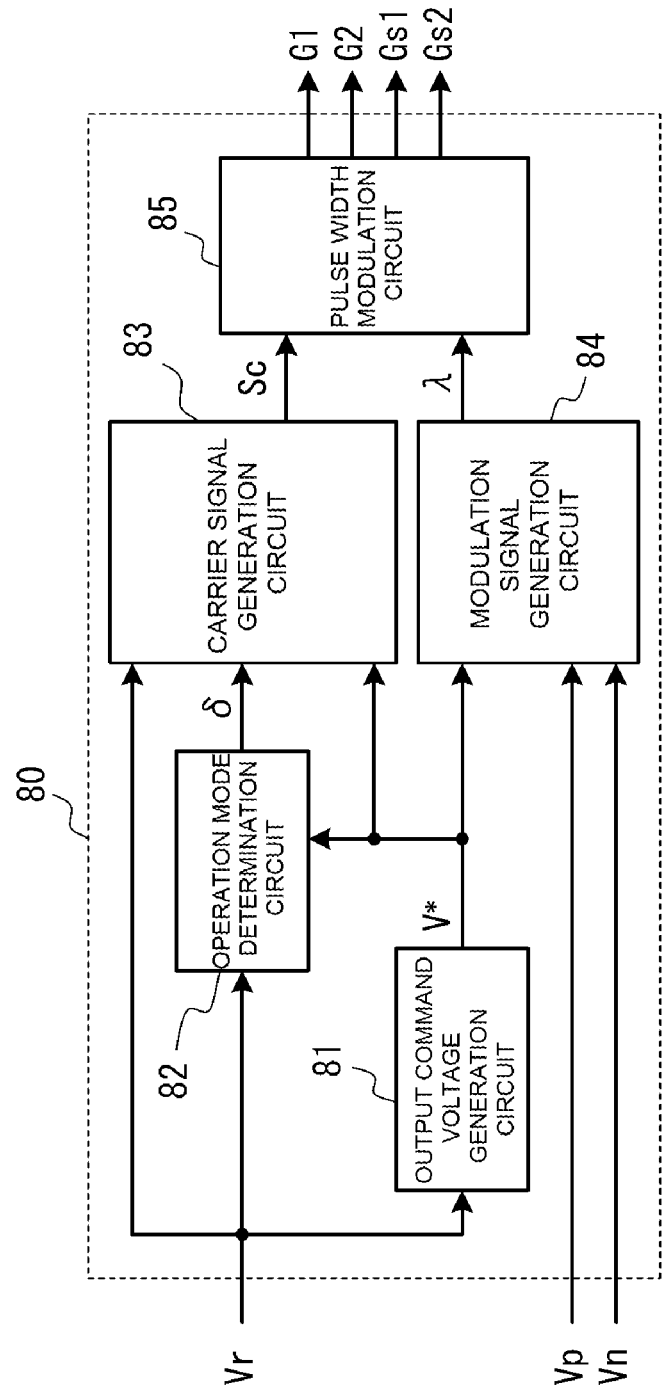
FIG. 2 is a diagram for illustrating a control section of the power conversion device to which the invention is applied.

In order to realize the heretofore described operation modes of the power conversion device, the control circuit 80 includes a function realized by the control block shown in FIG. 2. The voltage Vr of the alternating current power source 1 detected by a voltage detector 71 is input to an output command voltage generation circuit 81, operation mode determination circuit 82, and carrier signal generation circuit 83 of the control circuit 80. Also, the voltage Vp of the direct current power source Psp detected by a voltage detector 72 and the voltage Vn of the direct current power source Psn detected by a voltage detector 73 are input to a modulation signal generation circuit 84.

The output command voltage generation circuit 81 outputs the output command voltage V* of the power conversion device. The output command voltage V* is synchronous with the voltage Vr of the alternating current power source 1. That is, the output command voltage generation circuit 81 generates the output command voltage V* having the same frequency as the voltage Vr. Further, the output command voltage generation circuit 81 stores a predetermined amplitude value, and generates the output command voltage V* having the same frequency as the voltage Vr with the predetermined amplitude. The output command voltage V* is input to the operation mode determination circuit 82 and modulation signal generation circuit 84.

The operation mode determination circuit 82 generates an operation mode signal δ of the power conversion device in accordance with a result of comparing the size of the voltage Vr of the alternating current power source 1 and the size of the output command voltage V*. That is, when the voltage Vr of the alternating current power source 1 is within a predetermined range with respect to the output command voltage V*, the operation mode determination circuit 82 sets the operation mode signal δ as a signal indicating the direct feed mode. Also, when the voltage Vr of the alternating current power source 1 is larger than the upper limit of the predetermined range with the output command voltage V* as a center, the operation mode determination circuit 82 sets the operation mode signal δ as a signal indicating the buck mode. Also, when the voltage Vr of the alternating current power source 1 is smaller than the lower limit of the predetermined range with respect to the output command voltage V*, the operation mode determination circuit 82 sets the operation mode signal δ as a signal indicating the boost mode. Hereafter, the lower limit of the predetermined range is referred to as a first set value.

When no direct feed mode is provided, the first set value is a value equal to the output command voltage V*.

The carrier signal generation circuit 83, in accordance with the operation mode signal δ, outputs, for example, a triangular wave shaped carrier signal Sc. Further, when the operation mode signal δ is of the boost mode, and the difference between the voltage Vr and the output command voltage V* is smaller than a predetermined value (a second set value) (a first condition), the carrier signal generation circuit 83 sets the frequency of the carrier signal Sc as a first frequency f1. Also, when the operation mode signal δ is of the boost mode, and the difference between the voltage Vr and the output command voltage V* is equal to or more than the predetermined value (second set value) (a second condition), the carrier signal generation circuit 83 sets the frequency of the carrier signal Sc as a second frequency f2. The carrier signal Sc output from the carrier signal generation circuit 83 is input to a pulse width modulation circuit 85.

Herein, the relationship in size between the output command voltage V* and the voltage Vr of the alternating current power source 1 can be determined by comparing the respective effective values of, or the respective instantaneous values of, the output command voltage V* and voltage Vr. When comparing the effective values of the two voltages, the carrier signal generation circuit 83 sets the frequency of the carrier signal Sc as the first frequency f1 or second frequency f2 for each cycle of the output voltage. Also, when comparing the instantaneous values of the two voltages, the carrier signal generation circuit 83 sets the frequency of the carrier signal Sc as the first frequency f1 or second frequency f2 for each compared control cycle.

Figure 3:
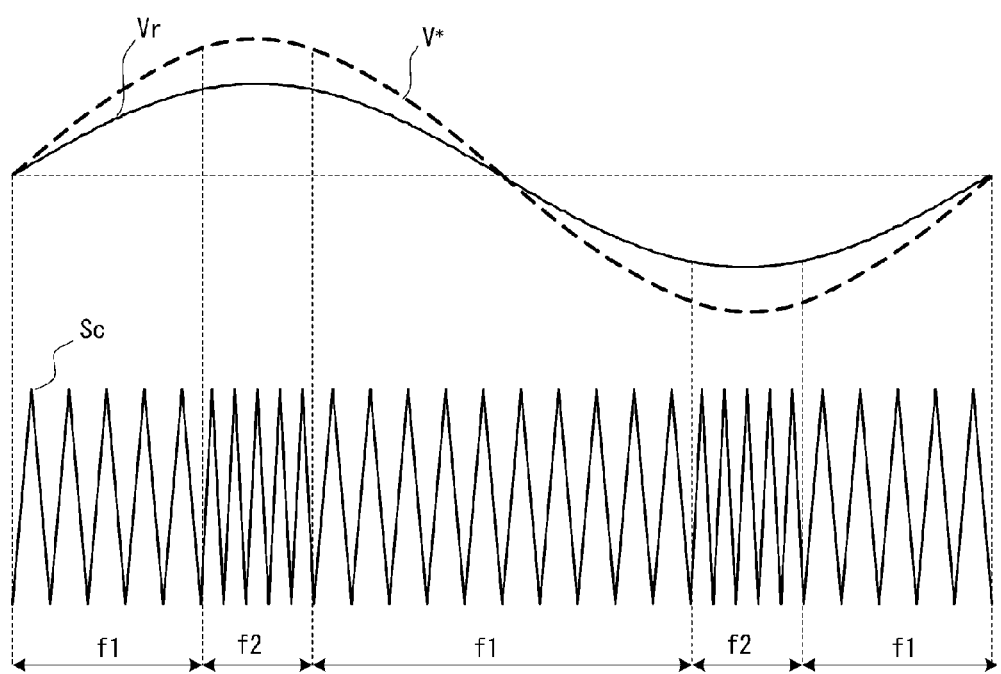
FIG. 3 is a diagram for illustrating a working example in which a carrier signal is switched.

FIG. 3 shows a relationship between signals when the frequency of the carrier signal Sc is set by comparing the respective instantaneous values of the output command voltage V* and the voltage Vr of the alternating current power source 1. For example, when the voltage Vr of the alternating current power source 1 drops while keeping sinusoidal, the difference between the output command voltage V* and the voltage Vr of the alternating current power source 1 is equal to or more than the second set value in the vicinity of $\pi/2$ and $3\pi/2$ in the phase of the output command voltage V*. The carrier signal generation circuit 83 sets the frequency of the carrier signal Sc as the second frequency f2 in a region in which the difference between the output command voltage V* and the voltage Vr of the alternating current power source 1 is equal to or more than the second set value (in the vicinity of $\pi/2$ and $3\pi/2$ in the phase of the output command voltage V*). The carrier signal generation circuit 83 sets the frequency of the carrier signal Sc as the first frequency f1 in the other region.

When comparing the respective effective values of the output command voltage V* and the voltage Vr of the alternating current power source 1, the carrier signal generation circuit 83 sets the frequency of the carrier signal Sc as the first frequency f1 or second frequency f2 for each cycle of the output command voltage V*.

When the operation mode signal δ indicates the direct feed mode or buck mode, the carrier signal generation circuit 83 sets the frequency of the carrier signal Sc as the first frequency f1. However, when the operation mode signal δ indicates the direct feed mode or buck mode, the carrier signal generation circuit 83 may set the frequency of the carrier signal Sc as a third frequency f3 different from the first frequency f1.

The modulation signal generation circuit 84 generates a modulation signal λ using the output command voltage V*. The modulation signal λ is a signal normalized with the amplitude of the carrier signal Sc as a reference. The voltages Vp and Vn of the direct current power source 30 are used to normalize the modulation signal λ. The modulation signal λ output from the modulation signal generation circuit 84 is input to the pulse width modulation circuit 85.

The pulse width modulation circuit 85, using the carrier signal Sc and modulation signal λ, generates control signals G1, G2, Gs1, and Gs2 for operating the inverter 40. The control signal G1 is a signal for on/off operating the switching element Q1. The control signal G2 is a signal for on/off operating the switching element Q2. The control signal Gs1 is a signal for on/off operating the switch element S1. The control signal Gs2 is a signal for on/off operating the switch element S2.

Figure 4:
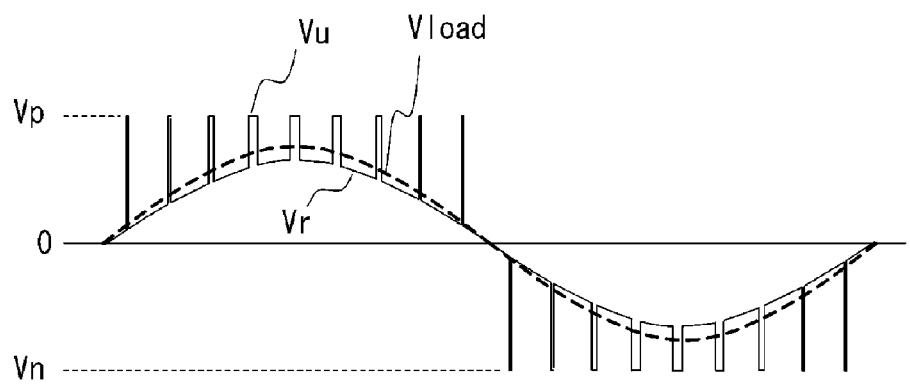
FIG. 4 is a diagram for illustrating output voltage waveforms when in a boost mode.

When the inverter 40 operates in the boost mode in accordance with the control signals output from the heretofore described control circuit 80, the alternating current voltage Vu shown in FIG. 4 is output between the terminals U and V. The alternating current voltage Vu is a voltage obtained by selectively outputting the voltage Vr of the alternating current power source 1 and the voltage Vp or voltage Vn. Many harmonic components are contained in the alternating current voltage Vu. The harmonic components can be removed by the filter 5. The sinusoidal alternating current voltage Vload is obtained by removing the harmonic components from the alternating current voltage Vu. The sinusoidal alternating current voltage Vload is applied to the load 6.

Figure 5:
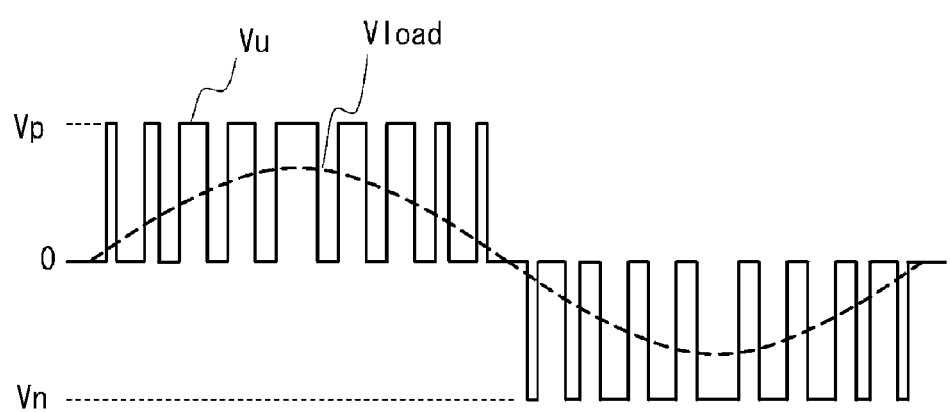
FIG. 5 is a diagram for illustrating output voltage waveforms when in the boost mode (Vr=0V).

When the voltage Vr of the alternating current power source 1 drops to 0V in the boost mode, the alternating current voltage Vu and the alternating current voltage Vload attain the respective waveforms shown in FIG. 5. As the voltage Vr of the alternating current power source 1 is 0V, the alternating current voltage Vu is a voltage whose amplitude is formed of the pulse train of Vp or Vn.

Next, a description will be given of a current Iu flowing through the reactor Lf of the filter 5.

As heretofore described, the inverter 40 operates in one of the direct feed mode, buck mode, and boost mode.

When the inverter 40 operates in the direct feed mode, the switching elements Q1 and Q2 are both turned off. Meanwhile, the bidirectional switch BS1 becomes bidirectionally conductible. In this case, the voltage Vr of the alternating current power source 1 is output between the terminals U and V. Consequently, the current Iu flowing through the reactor Lf is sinusoidal. No ripple component resulting from the operation of the inverter 40 is contained in the current Iu.

When the inverter 40 operates in the buck mode, the switching elements Q1 and Q2 are both turned off. Meanwhile, the bidirectional switch BS1 carries out an on/off operation in accordance with the control signals Gs1 and Gs2. The control signals Gs1 and Gs2 are signals which are pulse-width modulated using the carrier signal Sc of the frequency f1 and the modulation signal λ.

In this case, the voltage Vu wherein the voltage Vr of the alternating current power source 1 is pulse-width modulated is output between the terminals U and V. Consequently, a ripple component generated as a result of the on/off operation of the bidirectional switch BS1 is contained in the current Iu flowing through the reactor Lf. The frequency of the ripple component is a frequency which is twice the frequency f1 of the carrier signal Sc.

When the inverter 40 operates in the boost mode, the bidirectional switch BS1 is always in an on-state. Meanwhile, the switching elements Q1 and Q2 carry out an on/off operation in accordance with the control signals G1 and G2. The control signals G1 and G2 are signals which are pulse-width modulated using the carrier signal Sc and modulation signal λ. The frequency of the carrier signal Sc is the first frequency f1 or the second frequency f2.

In this case, the voltage Vu obtained by alternately selecting the voltage Vr of the alternating current power source 1 and a voltage wherein the voltage of the direct current power source 30 is pulse-width modulated is output between the terminals U and V. Consequently, a ripple component generated as a result of the on/off operation of the switching elements Q1 and Q2 is contained in the current Iu flowing through the reactor Lf. The frequency of the ripple component is a frequency which is twice the frequency of the carrier signal Sc.

Herein, when the inverter 40 operates in the boost mode, the ripple current flowing through the reactor Lf becomes larger as the difference between the output command voltage V* and the voltage Vr of the alternating current power source 1 increases. Meanwhile, when the frequency of the carrier signal Sc is high, the ripple current flowing through the reactor Lf is small. However, when the frequency of the carrier signal Sc is high, the switching loss of the switching elements Q1 and Q2 increases.

Consequently, the inductance value of the reactor Lf and the frequency of the carrier signal Sc are set so that the size of the ripple current flowing through the reactor Lf has a predetermined value. Further, the first frequency f1 of the carrier signal Sc is set on condition that the difference between the output command voltage V* and the voltage Vr of the alternating current power source 1 is equal to the preset second set value.

A loss (a first loss) caused in the reactor Lf by a ripple current (a first ripple current) flowing through the reactor Lf at this time is set so as to be within a predetermined value. Also, the value of a maximum current (a first maximum current value) flowing through the reactor Lf is set so as to be within a range in which the switching elements Q1 and Q2 are controllable.

Next, the second frequency f2 of the carrier signal Sc is set on condition that the voltage Vr of the alternating current power source 1 is 0V. The inductance value of the reactor Lf is a value set in the heretofore described.

On the heretofore described conditions, when the inverter 40 operates in the boost mode, the ripple current flowing through the reactor Lf has substantially the same value as the first ripple current. Also, the maximum value of the current flowing through the reactor Lf is substantially the same as the first maximum current value.

Meanwhile, by the frequency of the ripple current becoming higher, the loss caused in the reactor Lf becomes larger than the first loss. However, as the thermal time constant of the reactor is longer than the instantaneous voltage drop time of the alternating current power source 1, no thermal problem arises.

As above, the power conversion device according to the embodiment can restrict the ripple current flowing through the reactor Lf to be within the predetermined value, even when there is an instantaneous voltage drop of the alternating current power source 1, while suppressing an increase in the inductance value of the reactor Lf.

Semiconductor elements configuring the switching elements Q1 and Q2 may be each configured of a wide band gap semiconductor with silicon carbide or gallium nitride as a material. The wide band gap semiconductor has the characteristics that lower loss and higher frequency are possible, and that a high temperature operation is possible.

Also, semiconductor elements configuring the bidirectional switch BS1 may similarly be each configured of a wide band gap semiconductor with silicon carbide or gallium nitride as a material.

Figure 6:
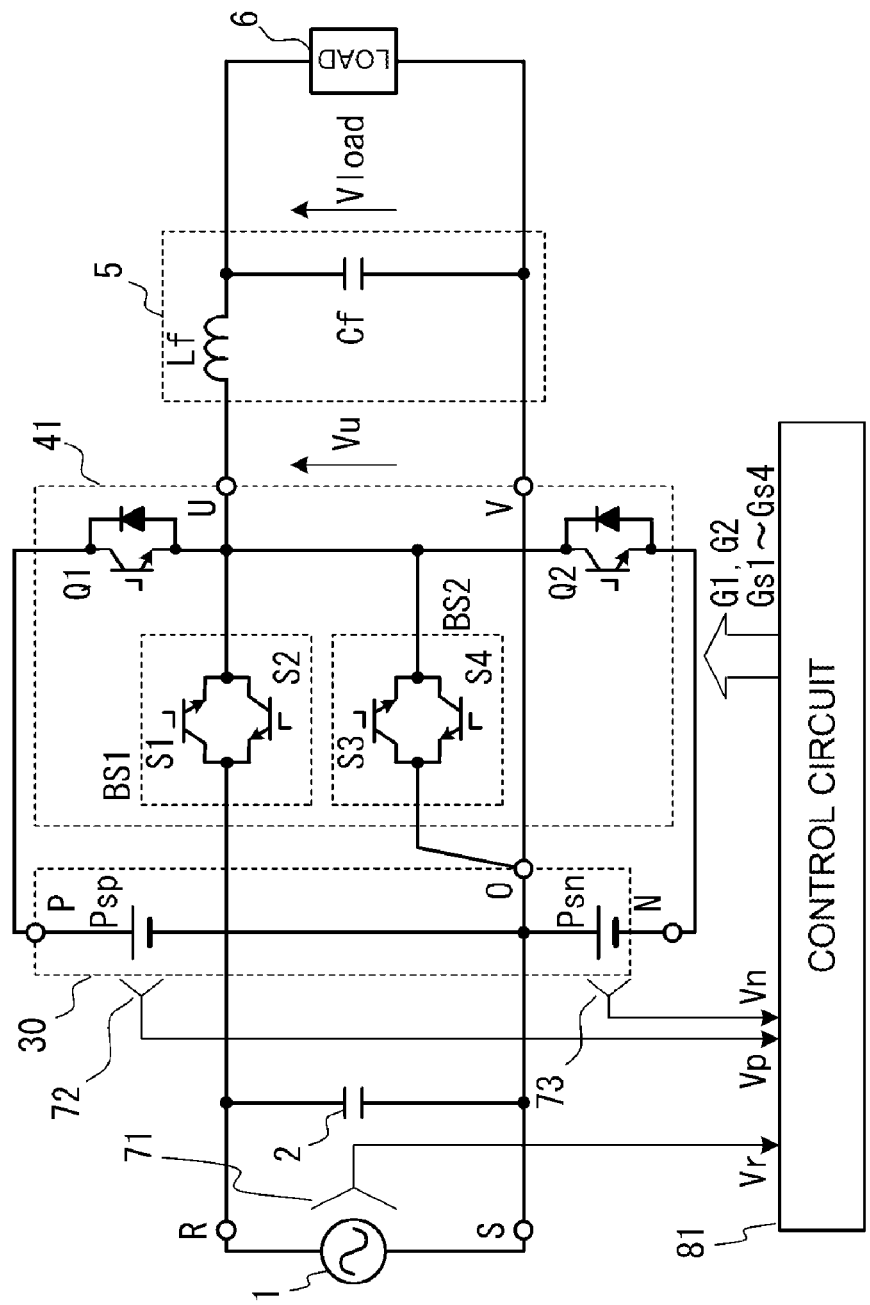
FIG. 6 is a diagram for illustrating another embodiment of the power conversion device to which the invention is applied.

The scope of application of the invention is not limited to the heretofore described embodiment. For example, the invention can also be applied to a power conversion device shown in FIG. 6. The power conversion device is different from the power conversion device shown in FIG. 1 in that an inverter 41, unlike the inverter 40, further includes a bidirectional switch BS2. The inverter 41, in the boost mode, carries out the same operation as the inverter 40 by turning off the bidirectional switches BS1 and BS2.

In this way, the invention can be applied to any power conversion device, including the switching elements Q1 and Q2 and bidirectional switch BS1 of the inverter circuit 40 shown in FIG. 1, which carries out a boost operation using the voltage Vr of the alternating current power source 1 and the voltage of the direct current power source 30.

The invention can be applied to a power conversion device, such as an instantaneous voltage drop compensation device or an uninterruptible power supply, for supplying a stable voltage to a load even when a voltage fluctuation of an alternating current power source and an interruption of the alternating current power source occur.

What is claimed is:

1. A power conversion device, comprising:
   a direct current (DC) power source configured to output a plurality of different DC voltages;
   an alternating current (AC) power source configured to output an AC voltage;
   an inverter configured to output an output voltage using the different DC voltages from the DC power source and the AC voltage from the AC power source in accordance with first and second control signals;
   a reactor configured to smooth the output voltage from the inverter; and
   a control circuit configured to
      generate the first control signal from a first carrier signal having a first frequency and an output command voltage in a first condition,
      generate the second control signal from a second carrier signal having a second frequency and said output command voltage in a second condition, the second frequency being higher than the first frequency, and output the first and second control signals to the inverter, said first condition being a condition in which the AC voltage is smaller than the output command voltage and a voltage difference between the output command voltage and the AC voltage is smaller than a predetermined value, said second condition being a condition in which the AC voltage is smaller than the output command voltage and said voltage difference is greater than said predetermined value.

2. The power conversion device according to claim 1, wherein the control circuit is configured to determine the first condition and second condition based on effective values of the output command voltage and the AC voltage.

3. The power conversion device according to claim 1, wherein the control circuit is configured to determine the first condition and second condition based on instantaneous values of the output command voltage and the AC voltage.

4. The power conversion device according to claim 1, wherein the control circuit is configured to set the first and second frequencies of the carrier signal so that maximum amplitudes of a ripple current flowing through the reactor when the inverter is operated with the first and second frequencies are substantially the same.

5. The power conversion device according to claim 1, wherein the control circuit is configured to set the second frequency of the carrier signal in accordance with said voltage difference.

6. The power conversion device according to claim 1, wherein the inverter is configured to operate until the AC voltage from the AC voltage source drops to 0V.

7. The power conversion device according to claim 1, wherein the inverter configured to selectively output the AC voltage from the AC power source and one of the different DC voltages from the DC power source as the output voltage in the first and second mode.

8. The power conversion device according to claim 1, wherein the inverter configured to output the AC voltage from the AC power source as the output voltage in a third mode.

9. The power conversion device according to claim 1, wherein the plurality of different DC voltages include a positive-level voltage and a negative-level voltage, and the AC power source is connected to an intermediate potential point, between the positive and negative voltages, of the DC power source.

10. The power conversion device according to claim 9, wherein
the inverter includes a switching element series circuit and a bidirectional switch having two ends,
the switching element series circuit is connected to both ends of the DC power source, and includes first and second switching elements that are connected in series, and first and second diodes that are respectively connected to the first switching element and the second switching element in reverse parallel, and
one end of the bidirectional switch is connected to a connection point of the first and second switching elements, and the other end of the bidirectional switch is connected to one end of the AC power source that has two ends, the other end of the AC power source being connected to the intermediate potential point of the DC power source.

11. The power conversion device according to claim 10, wherein the first and second switching elements includes metal-oxide-semiconductor field-effect transistors (MOSFETs) each formed of a wide band gap semiconductor with either silicon carbide or gallium nitride as a material.

12. The power conversion device according to claim 10, wherein the first and second diodes are each formed of a wide band gap semiconductor with either silicon carbide or gallium nitride as a material.

13. The power conversion device according to claim 10, wherein the bidirectional switch is configured by connecting metal-oxide-semiconductor field-effect transistors (MOSFETs), each formed of a wide band gap semiconductor with either silicon carbide or gallium nitride as a material, in reverse parallel.

14. The power conversion device according to claim 10, wherein the bidirectional switch includes diodes each formed of a wide band gap semiconductor with either silicon carbide or gallium nitride as a material.

15. A power conversion device, comprising:
an alternating current (AC) power source configured to output an AC voltage;
a direct current (DC) power source configured to output a plurality of DC voltages having different levels;
an inverter configured to receive the AC voltage from the AC power source and the plurality of DC voltages from the DC power source and output an output voltage by boosting the AC voltage from the AC power source in a booster mode in accordance with first and second control signals, said booster mode being a mode in which a level of the AC voltage from the AC power source is smaller than a predetermined value;
a reactor configured to smooth the output voltage from the inverter; and
a control circuit configured to
generate the first control signal using a first carrier signal having a first frequency and the second control signal using a second carrier signal having a second frequency that is different from the first frequency in said booster mode and
selectively output the first or second control signal in accordance with the level of the AC voltage from the AC power source.

16. The power conversion device according to claim 15, wherein the inverter includes a plurality of switching elements configured to be switched by the first or second control signals in accordance with the level of the AC voltage from the AC power source in said booster mode.

17. The power conversion device according to claim 15, wherein
the second frequency is higher than the first frequency, and
the control circuit is configured to generate the first control signal when a voltage difference between the AC voltage from the AC power source and the predetermined value is smaller than an other predetermined value, and generate the second control signal when said voltage difference is greater than the other predetermined value.

* * * * *